United States Patent [19]
Miyauchi et al.

[11] Patent Number: 5,501,519
[45] Date of Patent: Mar. 26, 1996

[54] SCREW HEAD FOR INJECTION MOLDING MACHINE

[75] Inventors: Mikiyoshi Miyauchi, Susono; Hiroyuki Kakishima, Shizuoka, both of Japan

[73] Assignee: Toshiba Machine Co., Ltd., Tokyo, Japan

[21] Appl. No.: 394,301

[22] Filed: Feb. 24, 1995

[30] Foreign Application Priority Data

Feb. 24, 1994 [JP] Japan ..................... 6-026528

[51] Int. Cl.$^6$ ..................... B29C 45/17
[52] U.S. Cl. ..................... 366/78; 366/81; 425/190
[58] Field of Search ..................... 366/69, 89, 78–82, 366/83–85, 97–99, 186, 194–196, 289, 318, 319; 425/190, 562, 563

[56] References Cited

U.S. PATENT DOCUMENTS

| | | | |
|---|---|---|---|
| 4,065,108 | 12/1977 | Olmsted | 366/76.1 |
| 4,105,147 | 8/1978 | Stubbe | 425/562 X |
| 4,377,180 | 3/1983 | Biljes | 425/562 X |
| 4,477,242 | 10/1984 | Eichlseder et al. | 425/562 X |
| 5,178,458 | 1/1993 | Hsu | 366/89 |
| 5,240,398 | 8/1993 | Akaguma et al. | 425/563 X |

FOREIGN PATENT DOCUMENTS

| | | | |
|---|---|---|---|
| 218033 | 1/1985 | German Dem. Rep. | 366/79 |
| 62-45864 | 12/1987 | Japan . | |
| 2101714 | 8/1990 | Japan . | |
| 437515 | 2/1992 | Japan . | |
| 653604 | 1/1986 | Switzerland | 366/79 |

OTHER PUBLICATIONS

"Stress concentration" Masataka Nishida published on Sep. 5, 1967, pp. 136, 137, 674, 675, 676, 677.

*Primary Examiner*—Charles E. Cooley
*Attorney, Agent, or Firm*—Cushman Darby & Darby

[57] ABSTRACT

A screw head for an injection molding machine is mounted to a distal end portion of a screw, and includes a trunk portion and a screw portion, and an undercut portion formed between the trunk portion and the screw portion, wherein a relationship between a shaft diameter e of the undercut portion and a nominal diameter f of the screw portion is defined as:

$$0.74f \leqq e \leqq 0.85f$$

and a relationship between the nominal diameter f of the screw portion and a radius r of curvature of the undercut portion is defined as:

$$0.5f \leqq r.$$

3 Claims, 1 Drawing Sheet

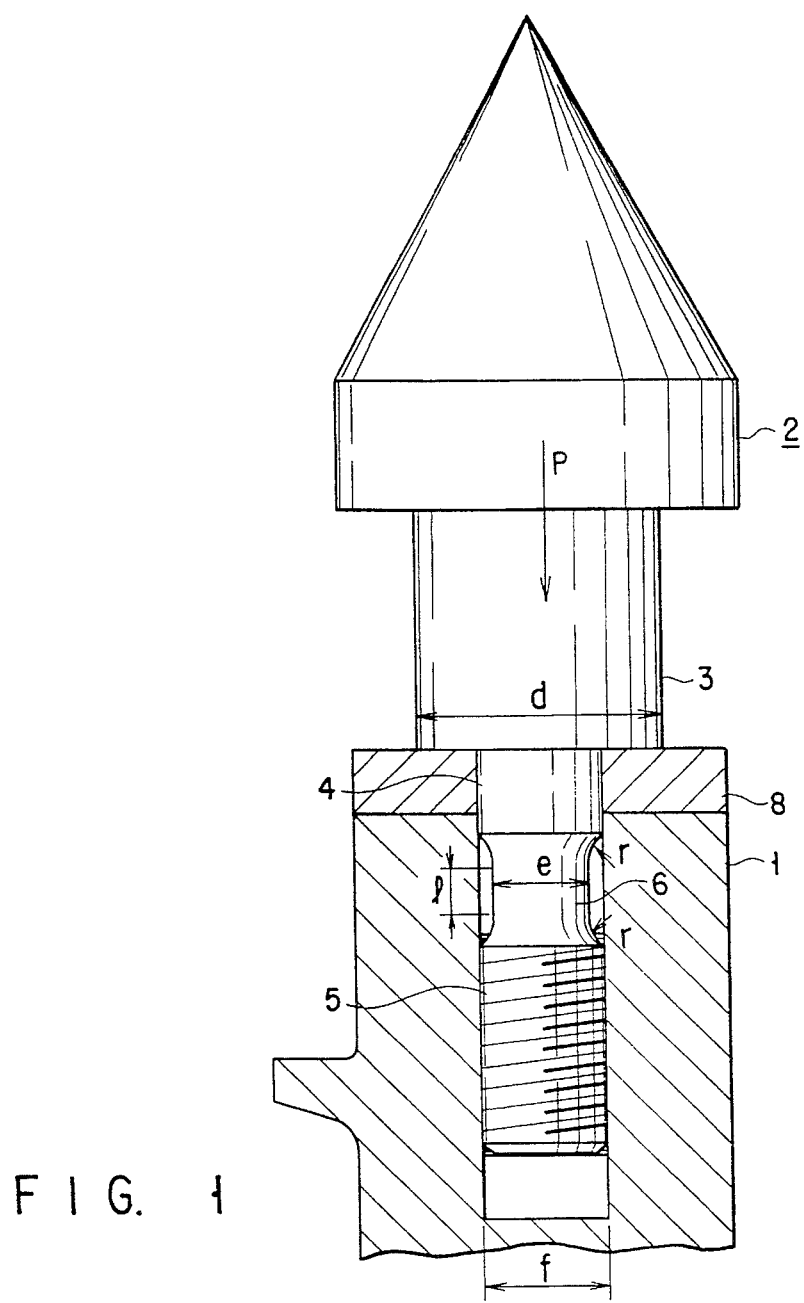
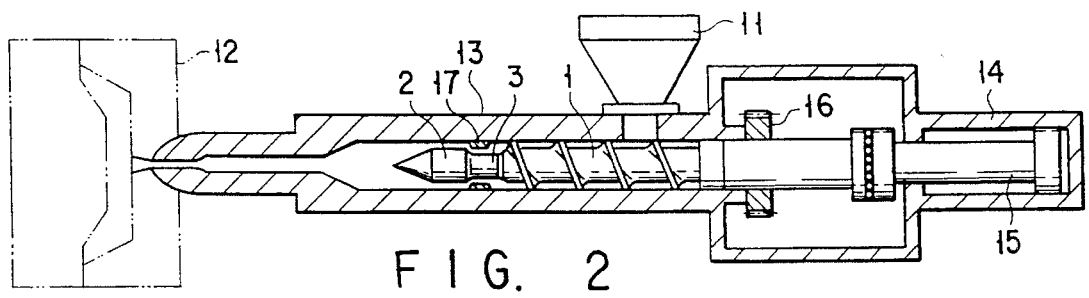

SCREW HEAD FOR INJECTION MOLDING MACHINE

BACKGROUND OF THE INVENTION

1. Field of the Invention

The present invention relates to a screw head of an injection molding machine and, more particularly, is directed to an increase in torsional and fatigue strength of the screw head.

2. Description of the Related Art

In an injection molding machine, as shown in FIG. 2, a resin material, supplied from a hopper 11, is plasticized by rotation of a screw 1. The plasticized resin material is injected into the cavity of a mold 12 to thereby injection-mold a desired article.

The screw 1 has a screw head 2 at its distal end portion. A ring 17, for preventing the reverse flow of the molten resin, is slidably arranged on a trunk portion 3 of the screw head 2. The injection molding machine shown in FIG. 2 has, in addition to the above structure, a barrel 13, an injecting cylinder 14, an injecting piston 15, and a screw rotating gear 16.

As shown in FIG. 1, the screw head 2 has a screw portion 5 and is mounted on the screw 1 by turning the screw portion 5 into the distal end portion of the screw 1.

The injection pressure of the resin repeatedly acts on the roots of the threads of the screw portion 5 of the screw head 2. The injection pressure can undesirably cause fatigue failure in the roots of the threads.

For this reason, an undercut portion 6 is provided between the trunk portion 3 and the screw portion 5 of the screw head 2, which reduces stress concentration at the roots of the threads.

According to, e.g., Jpn. UM Appln. KOKOKU Publication No. 62-45864, the diameter of the undercut portion is set in the range of 0.4 to 0.6 the diameter of the screw portion for the purpose of equalizing the fatigue strength of the screw portion and that of the undercut portion. According to "Stress Concentration" written by Masataka Nishida, the diameter of the undercut portion is set to 1/1.4 (=0.71) the diameter of the screw portion for the purpose of equalizing the stress concentration coefficient of the screw portion and that of the undercut portion.

However, in addition to the fatigue failure caused by the repeated stress generated in the screw portion by large injection pressure at the distal end portion of the screw head, the present inventors point out the following fact as the cause of the failure of the screw head of an injection molding machine. Namely, when an excessive load acts on the screw head, especially upon starting of the injection molding machine, static failure is often caused by the torsion of the undercut portion. At the starting of the injection molding machine, the resin material guided to the screw head is not sufficiently melted. Since the screw is rotated while the screw head is fixed to the barrel with the resin material, the torque of the motor acts entirely on the screw head, thereby causing this static failure phenomenon of the undercut portion. Therefore, the static failure phenomenon caused by torsion at the undercut portion should be analyzed and solved as a problem inherent to the injection molding machine. In other words, this problem is in addition to the fatigue failure occurring in the screw portion, which can be analyzed on the analogy of a bolt. Although a problem of the screw portion is posed, few experiments have been conventionally conducted by supposing the screw head portion of an injection molding machine. Most of the experiments on the fatigue of the screw are conducted as fatigue tests under tension and compression in which the screw portion is not clamped. Therefore, it is conventionally difficult to obtain an optimum shape of the screw head.

With the diameter of the undercut portion disclosed in the aforementioned prior art, the torsional strength of the undercut portion becomes lower than that of the screw portion. Thus, excessive load acting on the screw head upon starting of the injection molding machine cannot be tolerated.

Jpn. UM Appln. KOKAI Publication No. 2-101714 discloses a lock nut method in which only a screw head is rotated, even if an excessive load acts on it. However, this has a complicated mechanism and thus cannot be adopted, especially in a small-size injection molding machine.

In Jpn. Pat. Appln. KOKAI Publication No. 4-37515, in order to solve the drawback caused by the solution of Jpn. UM Appln. KOKOKU Publication No. 62-45864, holes are formed at the centers of a screw portion and a screw neck portion in the axial direction, and the outer diameter of the undercut portion is set equal to the outer diameter of the screw portion.

According to this proposal, some effect may be obtained since the torsional strength is inversely proportional to the cube of the outer diameter of the shaft. However, the torsional strength of the undercut portion becomes much lower than that of the screw portion. Therefore, the problem of the undercut portion failing when an excessive load acts on the screw head upon starting of the injection molding machine, which is inherent to the injection molding machine, is left unsolved.

In particular, in a small-size screw head, since the shaft has a small diameter, it is difficult to form a hole in it.

SUMMARY OF THE INVENTION

It is, therefore, an object of the present invention to provide an undercut portion such that the screw portion will not be subject to fatigue failure, thereby increasing the fatigue strength of the screw portion of the screw head and, also to provide an undercut portion that will not be subject to static failure even if an excessive load is generated at starting due to a large torque transiently acting on the screw head when, e.g., the resin reaching the screw head is not sufficiently melted.

It is another object of the present invention to provide a most powerful screw head by combining these two sets of conditions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

FIG. 1 is a sectional view showing a mounting structure of a screw head according to an embodiment of the present invention; and FIG. 2 is a sectional view of an injection molding machine to which the screw head according to the embodiment of the present invention is mounted.

DETAILED DESCRIPTION OF THE PREFERRED EMBODIMENT

A preferred embodiment of the present invention will be described with reference to the accompanying drawings.

FIG. 1 shows the distal end portion of a screw 1 of an injection molding machine.

A screw head 2 is mounted to the distal end portion of the screw 1. The screw head 2 has a trunk portion 3 extending from a conical tip, a neck portion 4, and a screw portion 5. An undercut portion 6, for increasing the fatigue strength of the screw portion 5, is formed between the neck portion 4 and the screw portion 5.

The screw head 2 is held on the screw 1 through a spacer 8 by threadably mounting its screw portion 5 on the distal end portion of the screw 1.

First, in order to find out the limit conditions between a diameter e of the undercut portion 6 and a nominal diameter f of the screw portion 5, with which fatigue rupture will occur in the screw portion at the maximum injection pressure of the molding machine that repeatedly acts on the thread portion when the nominal diameter f was maintained at a predetermined value and the diameter e of the undercut portion 6 was changed, the following test was conducted. The result shown in the following Table 1 was obtained.

More specifically, a plurality of screw heads 2 whose undercut portions 6 have different diameters e were prepared. Each of these screw heads 2 was mounted on the distal end portion of the screw 1 as described above, and a load corresponding to the injection pressure was applied, thereby conducting the fatigue test.

The load was defined as (sectional area of trunk portion 3 of screw head 2)×(injection pressure), and the maximum injection pressure P=25 kgf/mm² of a commercially available injection molding machine was employed as the load.

The screw portion 5 of each screw head 2 was lubricated with a working fluid, and was clamped with a force of 50% the yield point of the material of the screw head.

Note that reference symbol d denotes the diameter of the trunk portion 3 of the screw head 2; f, the nominal diameter of the screw portion 5; and r, the radius of curvature of the undercut portion 6. It is known that failure occurs when r<0.5×f. Thus, the test was conducted with r=0.5×f, which is the minimum limit with which rupture does not occur.

Reference symbol l denotes the length of a portion of the undercut portion 6 which is parallel to its axis. The length l was set to ½ the length of the undercut portion 6.

TABLE 1

| Diameter (e) of Under Portion | Number of Cycles | State of Rupture |
| --- | --- | --- |
| 1.0 × f | 5 × 10⁴ | Rupture in Screw Portion |
| 0.9 × f | 53 × 10⁴ | " |
| 0.85 × f | 200 × 10⁴ | Not Leading to Rupture |
| 0.80 × f | 200 × 10⁴ | " |

TABLE 1-continued

| Diameter (e) of Under Portion | Number of Cycles | State of Rupture |
| --- | --- | --- |
| 0.75 × f | 200 × 10⁴ | " |

As is apparent from the result of the fatigue test shown in Table 1, when the diameter e of the undercut portion 6 is equal to 0.85×(nominal diameter f of screw portion 5) or less, the screw portion 5 will not cause fatigue rupture even if the maximum injection pressure P=25 kgf/mm².

As described above, in addition to fatigue rupture of the screw portion 5 caused by the repeated injection pressure, the failure of the screw head 2 is also caused by the static rupture caused by torsion which occurs when the screw 1 is rotated upon starting of the molding machine containing a non-molten resin.

The torsional rupture is caused by a torsion which is transiently generated when the screw 1 is rotated while the screw head 2 is fixed with a non-molten resin.

When the undercut portion 6 is provided, if the diameter of the undercut portion 6 is excessively small, the undercut portion 6 will fail due to the transient torsional load described above.

For this reason, the torsional strength of the undercut portion 6 must be equal to or higher than the torsional strength of the screw portion 5.

When a torsional strength $\tau$ of the screw portion 5 is calculated, it is expressed as:

$$\tau = \{(16 \times T)/(\pi \times f^3)\} \times \alpha \quad (1)$$

where T: clamping torque f: nominal diameter of the screw portion $\alpha$: stress concentration coefficient of the notch of the root of the thread When $\alpha$ of the screw portion 5 is calculated in accordance with the Neuber scheme, it takes a value having a range of 2.5 to 2.7.

A torsional strength $\tau_1$ of the undercut portion 6 is expressed similarly to equation (1) as follows:

$$\tau_1 = \{(16 \times T)/(\pi \times e^3)\} \times \alpha_1 \quad (2)$$

where T: clamping torque e: diameter of the undercut portion $\alpha_1$: stress concentration coefficient of the undercut portion The stress concentration coefficient $\alpha_1$ of the undercut portion 6 can be set to 1 if the radius r of curvature of the undercut portion 6 and the nominal diameter f of the screw portion 5 satisfy $r \geq f/2$ (see "Stress Concentration" written by Masataka Nishida).

From equations (1) and (2), e=(0.72 to 0.74)×f.

As a result, (i) in the range of e<0.72×f, static rupture will occur in the undercut portion;

(ii) in the range of 0.72×f≦e<0.74×f, static rupture will sometimes occur and sometimes not in the undercut portion; and (iii) in the range of e≧0.74×f, when the screw head 2 is fixed with a non-molten resin, static rupture will not occur in the undercut portion by a torsion which is transiently generated when the screw 1 is rotated.

Therefore, when the conditions obtained by the test shown in Table 1, with which fatigue rupture will not occur in the screw portion 5 by the repeated injection pressure, i.e., diameter (e) of undercut portion $\leq$ 0.85×nominal diameter (f) of screw portion is considered together with the results (i), (ii), and (iii), the most preferable shape of the undercut portion 6 of the screw 1 is the one that satisfies: 0.74× nominal diameter (f) of screw portion $\leq$ diameter (e) of undercut portion $\leq$ 0.85×nominal diameter (f) of screw portion and $r \geq f/2$ The longer the length l of the portion of the undercut portion 6 shown in FIG. 1 which is parallel to the axis, the smaller the stress concentration to the screw portion 5. If the length l is set to ½ or more the entire length of the undercut portion 6, the stress concentration coefficient of this parallel portion can be made to 1.

As has been described above, according to the present invention, the screw portion will not cause fatigue rupture with the maximum injection pressure, and even if an excessive load is generated as the one which is transiently seen upon starting of the molding machine in which a non-molten resin exists, the undercut portion will not cause static rupture.

When the torsional rigidity of the undercut portion is compared with that disclosed in Jpn. UM Appln. KOKOKU Publication No. 62-45864, it is 4 times or more.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A screw head for a screw of an injection molding machine, mounted to a distal end portion of the screw, said screw head comprising:

a tip portion at a first end of the screw head;

a trunk portion extending axially away from the tip portion;

a screw portion at a second end of said screw head opposite said tip portion, said screw portion having a nominal diameter f; and an undercut portion formed between said trunk portion and said screw portion, said undercut portion having a shaft portion of diameter e and curved portions, each having a radius of curvature r at opposite ends of the shaft portion, wherein a relationship between the shaft diameter e of said undercut portion and the nominal diameter f of said screw portion is defined as:

$$0.74f \leq e$$

and, a relationship between the nominal diameter f of said screw portion and the radius of curvature r of said undercut portion is defined as:

$$0.5f \leq r.$$

2. A screw head for a screw of an injection molding machine, mounted to a distal end portion of the screw, said screw head comprising:

a tip portion at a first end of the screw head;

a trunk portion extending axially away from the tip portion;

a screw portion at a second end of said screw head opposite said tip portion, said screw portion having a nominal diameter f; and an undercut portion formed between said trunk portion and said screw portion, said undercut portion having a shaft portion of diameter e and curved portions, each having a radius of curvature r, at opposite ends of the shaft portion, wherein a relationship between the shaft diameter e of said undercut portion and the nominal diameter f of said screw portion is defined as:

$$0.74f \leq e \leq 0.85f$$

and a relationship between the nominal diameter f of said screw portion and the radius of curvature r of said undercut portion is defined as:

$$0.5f \leq r.$$

3. A screw head according to any one of claims 1 to 2, wherein said undercut portion has a portion parallel to an axis of the undercut portion which has a length not less than ½ a total length of said undercut portion.

* * * * *